(12) United States Patent
Yu et al.

(10) Patent No.: US 9,319,681 B2
(45) Date of Patent: Apr. 19, 2016

(54) SIGNALING OF TEMPORAL MOTION VECTOR PREDICTOR (MVP) ENABLE FLAG

(71) Applicant: Google Technology Holdings LLC, Mountain View, CA (US)

(72) Inventors: Yue Yu, San Diego, CA (US); Jian Lou, Cupertino, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 426 days.

(21) Appl. No.: 13/862,297

(22) Filed: Apr. 12, 2013

(65) Prior Publication Data

US 2014/0023142 A1    Jan. 23, 2014

Related U.S. Application Data

(60) Provisional application No. 61/672,760, filed on Jul. 18, 2012, provisional application No. 61/672,762, filed on Jul. 18, 2012, provisional application No. 61/683,714, filed on Aug. 15, 2012, provisional application No. 61/703,776, filed on Sep. 21, 2012.

(51) Int. Cl.
*H04N 7/12* (2006.01)
*H04N 19/51* (2014.01)
(Continued)

(52) U.S. Cl.
CPC ....... *H04N 19/00684* (2013.01); *H04N 19/463* (2014.11); *H04N 19/52* (2014.11)

(58) Field of Classification Search
CPC   H04N 19/00684; H04N 19/52; H04N 19/463
See application file for complete search history.

(56) References Cited

U.S. PATENT DOCUMENTS

| 2003/0058238 A1 | 3/2003 | Doak et al. |
| 2003/0107815 A1 | 6/2003 | Redmond |

(Continued)

FOREIGN PATENT DOCUMENTS

| EP | 1422946 | 5/2004 |
| WO | WO2011050641 | 5/2011 |
| WO | WO2013116608 A1 | 8/2013 |

OTHER PUBLICATIONS

Bross B et al: "High Efficiency Video Coding (HEVC) text specification draft 6", 8. JCT-VC Meeting; 99. MPEG Meeting; Jan. 2, 2012-Oct. 2, 2012; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-H1003, Feb. 10, 2012, all pages.

(Continued)

*Primary Examiner* — Tat Chio
(74) *Attorney, Agent, or Firm* — Young Basile Hanlon & MacFarlane P.C.

(57) ABSTRACT

In one embodiment, a method determines an I slice in a current picture that is currently being encoded and a value for a flag to enable or disable using temporal motion vector predictors for the I slice. The value for the flag is encoded in an encoded bitstream associated with the I slice being encoded. The method then sends the encoded bitstream to a decoder where encoding the value for the flag for the I slice allows pictures that follow the I picture in a decoding order to use temporal motion vector predictors from a picture that precedes the I picture in the decoding order when temporal motion vector predictors are enabled.

20 Claims, 8 Drawing Sheets

(51) Int. Cl.
*H04N 19/52* (2014.01)
*H04N 19/463* (2014.01)

(56) References Cited

U.S. PATENT DOCUMENTS

| | | | |
|---|---|---|---|
| 2005/0013365 | A1 | 1/2005 | Mukerjee et al. |
| 2005/0046702 | A1 | 3/2005 | Katayama et al. |
| 2005/0053137 | A1 | 3/2005 | Holcomb |
| 2005/0117646 | A1 | 6/2005 | Joch et al. |
| 2005/0152452 | A1 | 7/2005 | Suzuki |
| 2005/0232356 | A1 | 10/2005 | Gomi et al. |
| 2005/0276448 | A1 | 12/2005 | Pryor |
| 2006/0104349 | A1 | 5/2006 | Joch et al. |
| 2006/0219857 | A1 | 10/2006 | Satterfield |
| 2006/0233252 | A1* | 10/2006 | Bhattacharya ....... H04N 19/159 375/240.16 |
| 2007/0063997 | A1 | 3/2007 | Scherer et al. |
| 2007/0286281 | A1 | 12/2007 | Tsuchiya et al. |
| 2008/0136923 | A1 | 6/2008 | Inbar et al. |
| 2008/0267290 | A1 | 10/2008 | Barbieri et al. |
| 2009/0003446 | A1 | 1/2009 | Wu et al. |
| 2009/0021588 | A1 | 1/2009 | Border et al. |
| 2009/0080535 | A1 | 3/2009 | Yin et al. |
| 2009/0087111 | A1 | 4/2009 | Noda et al. |
| 2009/0129472 | A1 | 5/2009 | Panusopone et al. |
| 2009/0168886 | A1 | 7/2009 | Ikeda et al. |
| 2010/0111182 | A1 | 5/2010 | Karczewicz et al. |
| 2010/0128995 | A1 | 5/2010 | Drugeon et al. |
| 2011/0002389 | A1 | 1/2011 | Xu et al. |
| 2011/0110428 | A1 | 5/2011 | Chang et al. |
| 2011/0228852 | A1 | 9/2011 | Budagavi |
| 2012/0082229 | A1 | 4/2012 | Su et al. |
| 2012/0236942 | A1 | 9/2012 | Lin et al. |
| 2012/0250773 | A1 | 10/2012 | Chien et al. |
| 2013/0128967 | A1 | 5/2013 | Yu et al. |
| 2013/0128969 | A1 | 5/2013 | Yu et al. |
| 2013/0128970 | A1 | 5/2013 | Yu et al. |
| 2013/0128977 | A1 | 5/2013 | Yu et al. |
| 2013/0163663 | A1 | 6/2013 | Yu et al. |
| 2013/0182769 | A1 | 7/2013 | Yu et al. |
| 2013/0202034 | A1 | 8/2013 | Yu et al. |
| 2013/0272375 | A1 | 10/2013 | Yu et al. |
| 2013/0272406 | A1 | 10/2013 | Yu et al. |
| 2013/0336403 | A1* | 12/2013 | Naing ............. H04N 19/00587 375/240.16 |
| 2014/0056356 | A1 | 2/2014 | Yu et al. |

OTHER PUBLICATIONS

Bross, Benjamin et al.: "High Efficiency Video Coding (HEVC) text specification draft 7,"Joint Collaborative Team on Video Coding(JCT-VC) of ISO/IEC JTC1/SC29/WG11 and ITU-T SG16 WP3, 9th Meeting : Geneva, CH, Apr. 27-May 7, 2012, JCTVC-I1003_d9, 278 pages.

Byeong-Moon Jeon. Alexixs Michael Tourapis: "B pictures in JVT" 4. JVT Meeting; 61.MPEG Meeting; Jul. 22, 2002-Jul. 26, 2002; Klagenfurt. AT; (Joint Video Team of ISO/IEC JTCI/SC291/WG11 and ITU-T SG.16), No. JVTD-DI55. Jul. 26, 2002, PX030005418.

Fang S et al.: "The Construction of Combined List for HEVC",6. JCT-VC Meeting; 97. MPEG Meeting; Jul. 14, 2011-Jul. 22, 2011;Torino;(Joint Collaborative Team on Video Coding of ISO/IEC JTC1/SC29/WG11 and ITU-T SG.16); URL:http://wftp3.itu.int/av-arch/jctvc-site/, No. JCTVC-F573. Jul. 16, 2011.

Guillaume Laroche et al.: "On memory compression for motion vector prediction", Mar. 10, 2011, No. JCTVC0E221, Mar. 10, 2011 all pages.

Hellman T et al.: "Limiting Collocated Temporal Reference to One Per Picture", Joint Collabortive Team on Video Coding of ISO/IEC JTC1/SC29/WG11 and ITU-T SG. 16, No. JCTVC-H0442, Jan. 20, 2012, JCT-VC Meeting; 99. MPEG Meeting; Jan. 2, 2012-Oct. 2, 2012; San Jose Retrieved from the Internet: URL:http://wftp3.itu.int/av-arch/jctvc-site/[retrieved on May 23, 2013], all pages.

I-L Kim et al.:"Restriction on motion vector scaling for Merge and AMVP", 8. JCT-VC Meeting; 98. MPEG Meeting; Nov. 21, 2011-Nov. 28, 2011; Geneva; (Joint Collaborative Team on Video Coding of Iso/IEC JTCI/SC29/WG11 and ITU-TSG.16);URL:http://wftp3.itu.int/av-arch/jctvc-site/, No. JCTVC-G551. Nov. 8, 2011 XP030110535.

IPRP, & Written Opinion of the International Searching Authority for International Application No. PCT/US2013054965, Feb. 15, 2015, 8 pages.

ISR and Written Opinion of the International Searching Authority for International Application No. PCTUS2012066146, Feb. 20, 2013, 15 pages.

ISR & Written Opinion RE: application PCTUS2012070871 dated Mar. 19, 2013, 15 pages.

ISR and Written Opinion of the International Searching Authority for International Application No. PCTUS2012065850, Feb. 17, 2013, 17 pages.

ISR, "ISR Search Report and Written Opinion of the International Searching Authority" for International Application No. ISR/US2013055968 dated Nov. 22, 2013 , 9 pages.

ISR, & Written Opinion of the International Searching Authority fo International Application No. ISR/US2012/065699 (CS39529), Jan. 25, 16 Pages.

ISR, & Written Opinion of the International Searching Authority for International Application No. ISR/US2013024294, Jul. 3, 2013, 13 pages.

ISR, & Written Opinion of the International Searching Authority for International Application No. ISR/US2013025988, May 14, 2013, 11 pages.

ISR, & Written Opinion of the International Searching Authority for International Application No. ISR/US2013025994, May 15, 2013, 12 pages.

Jian-Liang Lin et al.:"Motion vector coding techniques for HEVC", Multimedia Signal Processing (MMSP), 2011 IEE 13th International Workshop on. IEEE Oct. 17, 2011 . pp. 1-6, XP03202755.

J-L Lin et al.:"Syntax for AMVP Parsing Error Control", 95. MPEG Meeting; Jan. 24, 2011-Jan. 28, 2011; DAEGU; (Motion Ipcture Expert Group or ISO/IEC JTC1/SC2911/WG11),, No. m18878, Jan. 23, 2011, all pages.

J-L Lin et al.:"Improved Advanced Motion Vector Prediction", 4. JCT-VC Meeting; 95. MPEG Meeting; Jan. 20, 2011-Jan. 28, 2011;Daegu;(Joint Collaborative Team on Video Coding of ISO/IEC JTC1/SC29/WG11 and ITU-T SG.16); URL:http://wftp3.itu.int/av-arch/jctvc-site/, No. JCTVC-D125. Jan. 15, 2011 XP030008165.

Jung J et al.: "Temporal MV predictor modification for MV-Comp, Skip Direct and Merge schemes", 4. JCT-VC Meeting; 95, MPEG Meeting; Jan. 20, 2011-Jan. 28, 2011; Daegu; (Joint Collaborative Team on Video Coding of ISO/IEC JCT1/SC29/WG11 and ITU-T SG16); URL; http://wftp3.itu.int/av-arch/jctvc-site/, No. JCTVC-D164, Jan. 15, 2011, all pages.

Kadono: "Memory Reduction for Temporal Direct Mode", 5, JVT Meeting; Oct. 14, 2002-Oct. 18, 2002; Geneva, CH; (Joint Video Team of ISC/IEC JTC1/SC29/WG11 and ITU-T SG16), No. JVT-E076, Oct. 18, 2002, all pages.

Li (USTC) B et al: "Constrained temporal motion vector prediction for error resillience", 4. JCT-VC Meeting; 95. MPEG Meeting; Jan. 20, 2011-Jan. 28, 2011; DAEGU; (Joint Collaborative Team on Video Coding of ISO/IEC JTC1/SC29/WT11 and ITU-T SG.16); URL:http://wftp3.itu.int/av-arch/jctvc-site/ No. JCTVC-D139, Jan. 15, 2011, all pages.

Li et al.,"Redundancy reduction in B-Frame coding at temporal level zero" Joint Collaborative Team on Video Coding (JCT-VC) of ITU-T SG16 WP3 and ISO/IEC JTC1/SC29/WG11; 3rd Meeting: Guangzhou, CN; Oct. 7-15, 2010; 6 pages.

Bordes et al.: "AHG9: Simplification of weighted prediction signaling in PPS," 10. JCT-VC Meeting; 101. Mpeg Meeting; Jul. 11, 2012-Jul. 20, 2012; Stockholm; (Joint Collaborative Team on Video Coding of ISO/IEC JTC1/SC29/WG11 and ITU-T SG16); URL: http://wftp3.itu.int/av-arch/jctvc-site/. No. JCTVC-J0504, Jul. 12, 2012, all pages.

Sjaberg R et al.: Absolute signaling of reference pictures, 6. JCT-VC Meeting; 97. MPEG Meeting; Jul. 14, 2011-Jul. 22, 2011; Torino;(Joint Collaborative Team on Video Coding of ISO/IEC JTCI/

(56) References Cited

OTHER PUBLICATIONS

SG29/WG11 and ITU-T SG.16);URL:http://wftp3.itu.int/av-arch/jctvc-site/, No. JCTVC-F493. Jul. 22, 2011 XP030009516.

Suzuki et al., "Extension of uni-prediction simplification in B slices" Joint Collaborative Team on Video Coding (JCT-VC) of ITU-T SG16 WP3 and ISO/IEC JTC1/SC29/WG11; 4th Meeting: Daegu. Lorea; JCTVC-D421 Jan. 20-28, 2011; 8 pages.

Toshiyasu Sugio et al.: CE9: Experiment A, I, J and S Modified derivation processof reference index for skip mode and temporal motion vector predictor, Mar. 18, 2011, No. JCTVC-E230, Mar. 18, 2011.

W-S Kim et al.: "Non-CE8: Method of visual coding artifact removal for SAO"> 7. JCT-VC Meeting; 98. MPEG Meeting; Nov. 21, 2011-Nov. 30, 2011; Geneva; (Joint Collaborative Team on Video Coding of ISO-IEC JTC1/SC29/WG11 and ITU-T SG.16) URL: http://wftp3.itu.int/av-arch/jctvc-site/,, No. JCTVC-G680, Nov. 9, 2011, all pages.

Y-K Wang et al.: AHG15: On sequence parameter set and picture parameter set, 7, JCT-VC Meeting; 98, MPEG Meeting; Nov. 21, 2011-Nov. 20, 2011; Geneva; (Joint Collaborative Team on Video Coding of ISO/IEC JTC1/SC29/WG11 and ITU-T SG16); URL: http://wftp3.itu.int/av-arch/jctvc-site/, No. JCTVC-G334, Nov. 9, 2011, all pages.

Yue Yu et al.: "Implicit Signaling of collocated picture for HEVC", 99.MPEG Meeting; Feb. 6, 2012-Feb. 18, 2012; San Josa CR; (Motion Picture Expert Group or ISO/IEC JTCI/SC29/WG11), No. m23429, Jun. 7, 2012 XP030051954.

Yue Yu et al.: "Modifications on signalling collocated picture", 9. JCT-VC Meeting; 188. MPEG Meeting; Apr. 27, 2012-May 7, 2012; Geneva; (Joint Collaborative Team on Video Coding of ISO/IEC JTCI/SC29/WG11 and ITU-T SG.16);URL:http://wftp3.itu.int/av-arch/jctvc-site/, No. JCTVC-I0266. Apr. 17, 2012 XP030112029.

Yue Yu et al.: "The Reference Picture Construction of Combined List for HEVC",7. JCT-VC Meeting; 98. MPEG Meeting; Nov. 21, 2011-Nov. 30, 2011;Geneva;(Joint Collaborative Team on Video Coding of ISO/IEC JTC1/SC29/WG11 and ITU-T SG.16); URL:http://wftp3.itu.int/av-arch/jctvc-site/, No. JCT-G717, Nov. 10, 2011.

Yue Yu.: "AHG21: The Improvements on Reference Picture Buffering and List Construction", Joint Collaborative Team on Video Coding of ISO/IEC JTC1/SC29/WG11 and ITU-T SG.16, no. Nov. 2011, JCT-VC Meeting; Nov. 21, 2011-Nov. 30, 2011 Geneva; 98, MPEG Meeting retrieved from the Internet: URL:http://wftp3.itu.int/av-arch/jctvc-site/2011_11_g_geneva/[retrieved on May 23, 2013], all pages.

Yue Yu et al.: "Simplification of MVP Design for HEVC",6. JCT-VC Meeting; 97. MPEG Meeting; Jul. 14, 2011-Jul. 22, 2011; Torino;(Joint Collaborative Team on Video Coding of ISO/IEC JTC1/SC29/WG11 and ITU-T SG.16); URL:http://wftp3.itu.int/av-arch/jctvc-site/, No. JCTVC-F575. Jul. 19, 2011 XP03009598.

Lim C S et al.: "High-level Syntax: Proposed fix on signalling of TMVP disabling flag", 9, JCT-VC Meeting; 100. MPEG Meeting ; Apr. 4, 2012-May 7, 2012; Geneva; (Joint Collaborative Team on Video Coding of ISO/IEC JTC1/SC29/WG11 and ITU-T SG.16); URL:http://wftp3.itu.int/av-arch/jctvc-site/,, No. JCTVC-I0420, Apr. 17, 2012, all pages.

Bross B et al.: "High Efficiency Video Coding (HEVC text specification draft 7", 9th. MPEG Meeting; Apr. 27, 2012-May 7, 2012; Geneva; (Motion Picture Expert Group or ISO/IEC JTC1/SC29/WG11), No. JCTVC-I1003, Jul. 14, 2012, pp. 37-79.

Yu Y et al.: "Modification of slice temporal mvp enable flag", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/,, No. JCTVC-K0251, Oct. 2, 2012, all pages.

LI-USTC) B et al.: "High-level Syntax: Marking process for non-TMVP pictures", 7. JCTV-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://wftp3.itu.int/av-arch/jctvc-site/ No. JCTVC-G398, Nov. 8, 2011, all pages.

Patent Cooperation Treaty, International Search Report and Written Opinion of the International Searching Authority for International Application No. PCT/US2013/054965, Oct. 22, 2013, 12 pages.

B. Bross et al. "High efficiency video coding (HEVC) text specification draft 7," Document of Joint Collaborative Team on Video Coding, JCTVC-I1003_d4, Apr. 27-May 7, 2012.

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Bin Li et al., "Redundancy Reduction in B-Frame Coding at Temporal Level Zero," JCTVC-C278, Oct. 7, 2010.

Ericsson, "Absolute signaling of reference pictures," JCTVC-F493 WG11 No. m20923, JCT-VC of ITU-T SG16 WP3 and ISO/IEC JTC1/SC29/WG11, 6th (JCTVCF493) Meeting: Torino (2011).

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Korean Office Action dated Aug. 12, 2015 in related matter. 11 pages.KR10-214-7013280.

Motorola Mobility, "The Construction of Combined List for HEVC," JCTVC-F573-r2, JCT-VC of ITU-T SG16 WP3 and ISO/IEC JTC1/SC29/WG11, 6th (JCTVCF573) Meeting: Torino, IT (Jul. 14-22, 2011).

Mozilla, "Introduction to Video Coding Part 1: Transform Coding", Video Compression Overview, Mar. 2012, 171 pp.

Office Action in a related matter. Korean Patent Application No. 10-2014-7017195, mailed Jul. 30, 2015 citing new art.

Overview; VP7 Data Format and Decoder. Version 1.5. On2 Technologies, IxNC. Dated Mar. 28, 2005.

Samsung Electronics Co., Ltd., "Restriction on motion vector scaling for Merge and AMVP," JCTVC-G551, JCT-VC of ITU-T SG16 WP3 and ISO/IEC JTC1/SC29/WG11, 7th (JCTVCG551) Meeting: Geneva, CH (Nov. 21-30, 2011).

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, IxNC. Dated Aug. 17, 2006.

VP6 Bitstream & Decoder Specification. Version 1.03. On2 Technologies, IxNC. Dated Oct. 29, 2007.

(56) References Cited

OTHER PUBLICATIONS

VP8 Data Format and Decoding Guide. WebM Project. Google On2. Dated: Dec. 1, 2010.

European Office Action for EP128140860 mailed Oct. 20, 2015, 10 pages.

Bross B et al: "High Efficiency Video (HEVC) text specification Working Draft 5", 7. JCT-VC Meeting; 98, MPEG Meeting; Nov. 21, 2011-Nov. 30, 2011; Geneva; (Joint Collaborative Team on Video Coding of ISO/IEC JTC1/SC29/WG11 and ITU-T SG. 16); URL:http://wftp3.itu.int/av-arch/jctvc-site/, no. JCTVC-G1103, Dec. 19, 2011, all pages.

* cited by examiner

SIGNALING OF TEMPORAL MOTION VECTOR PREDICTOR (MVP) ENABLE FLAG

CROSS REFERENCE TO RELATED APPLICATIONS

The present disclosure claims priority to:

U.S. Provisional App. No. 61/672,760 for "MODIFICATION OF SLICE HEADER FOR HEVC" filed Jul. 18, 2012;

U.S. Provisional App. No. 61/672,762 for "MODIFICATION OF PIC TEMPORAL MVP ENABLE FLAG FOR HEVC" filed Jul. 18, 2012;

U.S. Provisional App. No. 61/683,714 for "Modification of slice_temporal_mvp_enable_flag for HEVC" filed Aug. 15, 2012;

U.S. Provisional App. No. 61/703,776 for "Modification of slice_temporal_mvp_enable_flag for HEVC" filed Sep. 21, 2012, the contents of all of which are incorporated herein by reference in its entirety.

BACKGROUND

Video compression systems employ block processing for most of the compression operations. A block is a group of neighboring pixels and may be treated as one coding unit in terms of the compression operations. Theoretically, a larger coding unit is preferred to take advantage of correlation among immediate neighboring pixels. Various video compression standards, e.g., Motion Picture Expert Group (MPEG)-1, MPEG-2, and MPEG-4, use block sizes of ×4, 8×8, and 16×16 (referred to as a macroblock (MB)).

High efficiency video coding (HEVC) is also a block-based hybrid spatial and temporal predictive coding scheme. HEVC partitions an input picture into square blocks referred to as coding tree units (CTUs) as shown in FIG. 1. Unlike prior coding standards, the CTU can be as large as 64×64 pixels. Each CTU can be partitioned into smaller square blocks called coding units (CUs). FIG. 2 shows an example of a CTU partition of CUs. A CTU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of CTU 100. Further, a CU 102-2 has been split into four CUs 102-5, 102-6, 102-7, and 102-8.

Each CU 102 may include one or more blocks, which may be referred to as prediction units (PUs). FIG. 3 shows an example of a CU partition of PUs. The PUs may be used to perform spatial prediction or temporal prediction. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s).

In HEVC, motion vectors (MVs) are predictively coded in a spatial/temporal prediction process. For a current PU having one current motion vector and an associated reference index, a motion vector predictor (MVP) is derived from motion vectors of spatially neighboring or temporally collocated PUs of the current PU. The difference between the current motion vector and the MVP is then determined and coded. This reduces overhead as only the difference is sent instead of information for the current motion vector. Also, when in merge mode, a single motion vector may be applied to a group of spatially neighboring or temporally collocated PUs.

In some cases, temporal motion vector predictors may not be used. For example, for an I slice, temporal motion vector predictors are not used to encode or decode PUs of the I slice.

DETAILED DESCRIPTION

Figure 1:
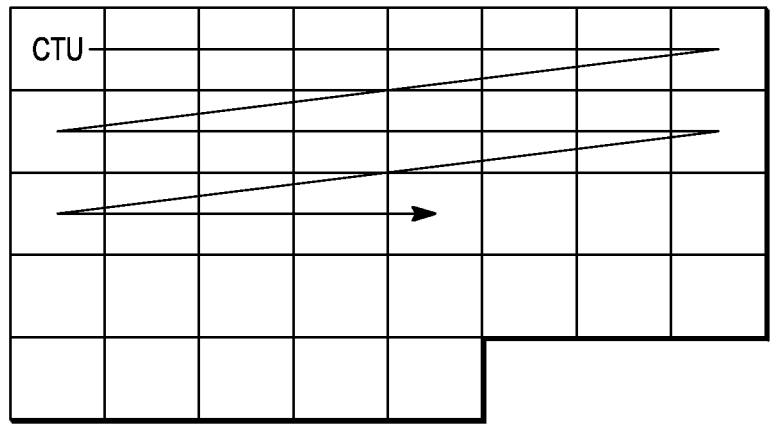
FIG. 1 shows an input picture partitioned into square blocks referred to as coding tree units (CTUs).
Figure 2:
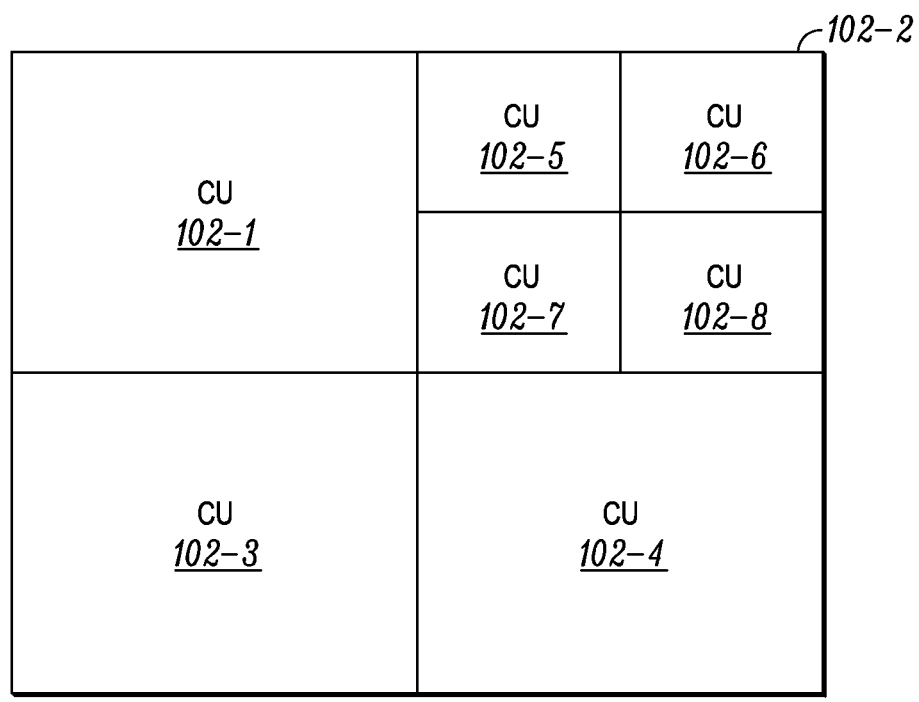
FIG. 2 shows an example of a CTU partition of CUs.
Figure 3:
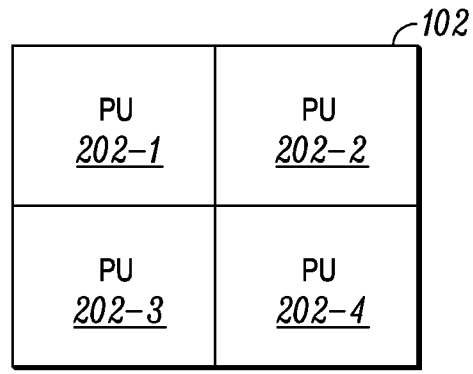
FIG. 3 shows an example of a CU partition of PUs.

Described herein are techniques for a video compression system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In one embodiment, a method determines a current picture and an I slice of the current picture. A flag is determined for the I slice and a value for the flag is determined for the I slice to enable or disable using temporal motion vector predictors. The method then encodes the value for the flag in an encoded bitstream associated with the I slice and sends the encoded bitstream to a decoder. Encoding the value for the flag allows pictures that follow the current picture in a decoding order to use temporal motion vector predictors from a picture that precedes the current picture in the decoding order when the flag for using temporal motion vector predictors is enabled.

In one embodiment, a method includes: receiving, by a computing device, an encoded bitstream; determining, by the computing device, a current picture in the encoded bitstream; determining, by the computing device, an I slice in the current picture; determining, by the computing device, a flag for the I slice; decoding, by the computing device, a value for the flag for the I slice to enable or disable using temporal motion vector predictors; determining, by the computing device, if the value for the flag enables using temporal motion vector predictors for the I slice; and if the value for the flag enables using temporal motion vector predictors for the I slice, allowing, by the computing device, pictures that follow the current picture in a decoding order to use temporal motion vector predictors from a picture that precedes the current picture in the decoding order when temporal motion vector predictors are enabled.

In one embodiment, a decoder includes: A decoder includes: one or more computer processors; and a non-transitory computer-readable storage medium comprising instructions that, when executed, control the one or more computer processors to be configured for: receiving an encoded bitstream; determining a current picture in the encoded bitstream; determining an I slice in the current picture; determining a flag for the I slice; decoding a value for the flag for the I slice to enable or disable using temporal motion vector predictors; determining if the value for the flag enables using temporal motion vector predictors for the I slice; and if the value for the flag enables using temporal motion vector predictors for the I slice, allowing pictures that follow the current picture in a decoding order to use temporal motion vector predictors from a picture that precedes the current picture in the decoding order when temporal motion vector predictors are enabled.

In one embodiment, an encoder includes: one or more computer processors; and a non-transitory computer-readable storage medium comprising instructions that, when executed, control the one or more computer processors to be configured for: determining a current picture; determining an I slice of the current picture; determining a flag for the I slice; determining a value for the flag for the I slice to enable or disable using temporal motion vector predictors; encoding the value for the flag in an encoded bitstream associated with the I slice; and allows pictures that follow the current picture in a decoding order to use temporal motion vector predictors from a picture that precedes the current picture in the decoding order when the flag for using temporal motion vector predictors is enabled.

Overview

Figure 4:
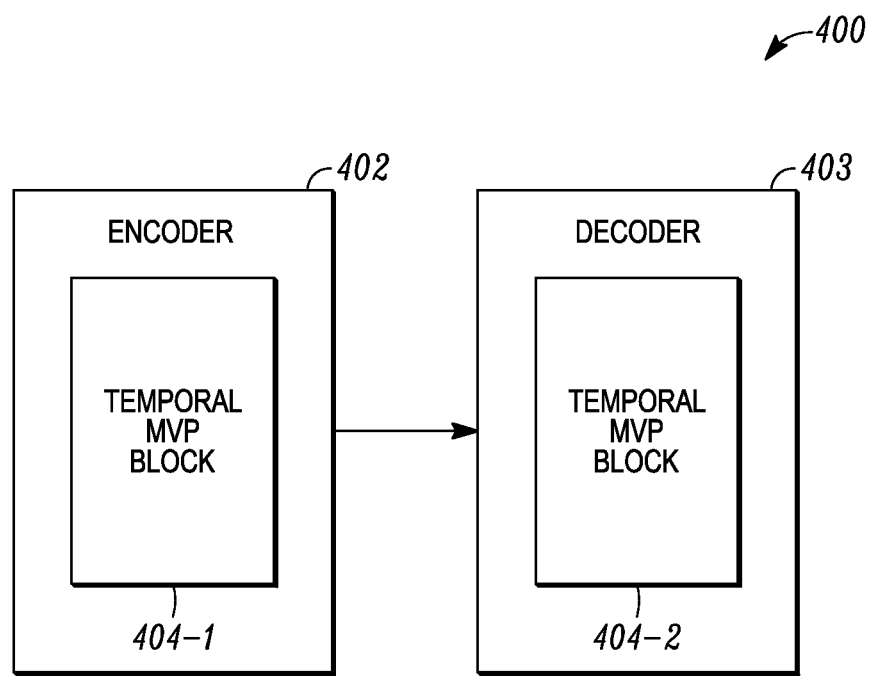
FIG. 4 depicts an example of a system for encoding and decoding video content according to one embodiment.

FIG. 4 depicts an example of a system 400 for encoding and decoding video content according to one embodiment. Encoder 402 and decoder 403 may encode and decode a bitstream using HEVC; however, other video compression standards may also be appreciated.

Encoder 402 includes a temporal motion vector predictor (MVP) block 404-1 and decoder 403 includes a temporal MVP block 404-2. Temporal motion vector predictor (MVP) block 404-1 and temporal MVP block 404-2 may perform functions associated with temporal motion vector prediction as will be described below.

A flag slice_temporal_mvp_enable_flag specifies whether temporal motion vector predictors can be used for inter-prediction. The flag slice_temporal_mvp_enable_flag may be associated with a slice of a picture. The slice may include one or more blocks, such as prediction units (PUs). If the flag slice_temporal_mvp_enable_flag is disabled, such as equal to 0, then temporal motion vector predictors shall not be used in encoding or decoding of a current slice, or picture. If the flag slice_temporal_mvp_enable_flag is enabled, such as equal to 1, then temporal motion vector predictors may be used in encoding or decoding of the current slice, or picture. That is, when temporal MVPs are enabled, temporal MVP blocks 404-1 and 404-2 may decide whether or not temporal motion vector predictors are used in encoding or decoding blocks of a slice. Also, when the flag slice_temporal_mvp_enable_flag is not present in an encoded bitstream, then decoder 403 infers that the value of the flag slice_temporal_mvp_enable_flag is disabled, or equal to 0.

A collocated reference picture includes motion vector (MV) information that can be used in a temporal prediction process. For example, a motion vector for a partition in the collocated reference picture may be used as a temporal motion vector predictor (MVP) in advanced motion vector prediction (AMVP) or as a temporal merge/skip candidate motion vector in a merge process. When the motion vector of the collocated block is used as a temporal MVP, a difference of the motion vector of the collocated block and the current motion vector of the current block is coded and sent from encoder 402 to decoder 403. When the motion vector of the collocated block is used in a merge process, the current block and the collocated block are merged and use the same motion vector of the collocated block.

The temporal MVP or temporal merge/skip candidate MV is defined as the MV of the selected collocated block, which resides in a reference picture and has the same geometrical position as a current block in the current picture. In one example, given a PU in a current slice, an associated collocated PU can reside in a preceding or subsequent PU in time. The collocated PU can be used as a candidate to enable MVP and merge/skip mode for the current PU. Like with a PU, a collocated block can be provided for a transform unit (TU), CU or a picture itself. Subsequent discussion will reference a slice, although the same could apply to any of the listed subcomponents of a picture. A slice may be one or more blocks. Each picture may have one or more slices. Additionally, a block may be referenced, which may be a PU, but may also be a TU, CU, a picture, or a slice.

Pictures may be classified in different layers. For example, when a picture is classified as a base layer picture, the picture is a reference picture with a temporal identifier (TemporalID) equal to 0. A base layer picture may be an I, P or B picture and can be references of other layers (e.g., the enhancement layer). When both the flag slice_temporal_mvp_enable_flag and TemporalID are equal to 0, all coded pictures that follow the current picture in the decoding order shall not use temporal motion vector predictors from any picture that precedes the current picture in the decoding order.

Figure 5A:
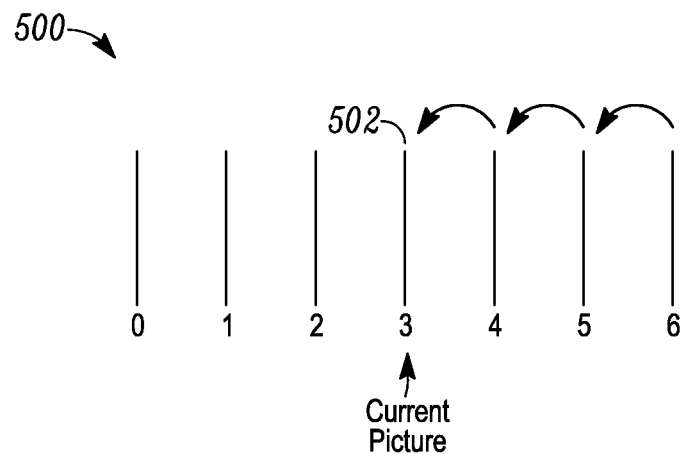
FIG. 5A shows an example of a decoding order of pictures according to one embodiment.

FIG. 5A shows an example of a decoding order of pictures according to one embodiment. The decoding order is the order pictures are decoded and may not necessarily represent the order in which pictures are displayed in the video. It should be noted that the decoding may be performed in the encoding process in encoder 402 or the decoding process in decoder 403. FIG. 5A shows a group of pictures 500. A current picture is shown at 502. Pictures 0, 1, and 2 are pictures that have been decoded already. Pictures 4, 5, and 6 are pictures that have not been decoded yet. At 502, a current picture is being decoded.

In this case, current picture 3 is an I picture, which means that current picture 3 includes I slices. Also, the TemporalID for current picture 3 is equal to 0 meaning that current picture 3 is a base layer picture. Conventionally, the flag slice_temporal_mvp_enable_flag for an I slice included in current picture 3 is disabled, or equal to 0. When these conditions are true (e.g., an I picture with TemporalID=0 and the flag slice_temporal_mvp_enable_flag=0), then pictures 4, 5, and 6 cannot use temporal motion vector predictors from pictures that precede current picture 3 in the decoding order, such as pictures 0, 1, and 2. In one example, pictures 4, 5, and 6 may use temporal motion vector predictors from current picture 3, and any pictures after current picture 3 in the decoding order. As shown, picture 4 may not use any temporal motion vector predictors because picture 3 is a I picture, picture 5 may use temporal motion vector predictors from picture 4, and picture 6 may use temporal motion vector predictors from picture 5.

Figure 5B:
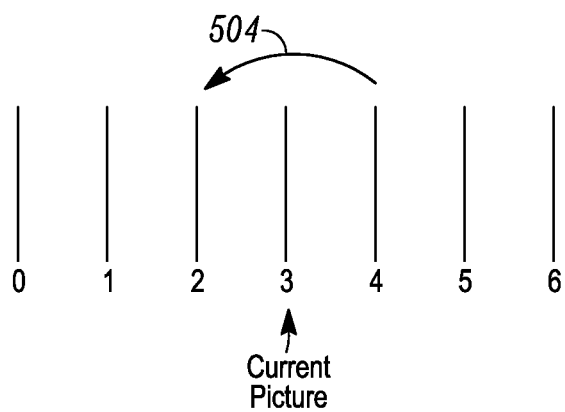
FIG. 5B depicts another example of a decoding order in which temporal motion vector predictors may be used from pictures preceding a base layer picture according to one embodiment.

FIG. 5B depicts another example of a decoding order in which temporal motion vector predictors may be used from pictures preceding an I picture according to one embodiment. The same decoding order as shown in FIG. 5A is shown in FIG. 5B. However, in this case, the flag slice_temporal_mvp_enable_flag for an I slice included in current picture 3 is enabled, or equal to 1. Additionally, the TemporalID for current picture 3 is equal to 0. In this case, the condition to test whether temporal MVs can be used for pictures preceding the current picture 3 is not met as the value of the flag slice_temporal_mvp_enable_flag is equal to 1 and the TemporalID is equal to 0. Thus, pictures 4, 5, and 6 may use temporal motion vector predictors from pictures that precede current picture 3 in the decoding order. For example, as shown at 504, picture 4 may use a temporal motion vector predictor from a picture 2. By allowing pictures 4, 5, and 6 to use temporal motion vector predictors from pictures preceding current picture 3, the coding performance may be improved. For example, pictures before current picture 3 may include blocks that may better predict blocks in picture 4.

Conventionally, the flag slice_temporal_mvp_enable_flag was not coded for an I slice. That is, encoder 402 would not have encoded a value for the flag slice_temporal_mvp_enable_flag for an I slice in the encoded bitstream and decoder 403 would not have decoded a value for the flag slice_temporal_mvp_enable_flag from the encoded bitstream. The reasoning for this is that an I slice does not use temporal MVs and thus coding a flag for the I slice would be unnecessary. This also reduces overhead as fewer bits need to be encoded if the flag slice_temporal_mvp_enable_flag is not coded for an I slice. When the flag slice_temporal_mvp_enable_flag is not included in the encoded bitstream, then decoder 403 infers that the value is equal to 0. Thus, the value of the flag slice_temporal_mvp_enable_flag would always be inferred to be 0 for an I slice.

In contrast to the conventional process, in particular embodiments, encoder 402 may encode a value for the flag slice_temporal_mvp_enable_flag for I slices. Thus, it is possible that the value for the flag slice_temporal_mvp_enable_flag is equal to 1 when coding an I slice. Even though the value of the flag slice_temporal_mvp_enable_flag is equal to 1, temporal MVs are not used for the I slice, such as decoder 403 may choose not to use temporal MVs for the I slice. However, the effect of this is shown in FIG. 5B, where when the value of the flag slice_temporal_mvp_enable_flag is equal to 1 and the value of the TemporalID is equal to 0, pictures after a current picture in the decoding order can use temporal MVs from pictures preceding the current picture in the decoding order. Although this may increase overhead as encoder 402 sends more bits in the encoded bitstream, this provides flexibility to improve coding performance. That is, the flexibility to allow pictures after an I picture in the decoding order to use temporal MVs from pictures preceding the I picture is possible. In one embodiment, a value for the flag slice_temporal_mvp_enable_flag may be coded for all slices, such as I slices, P slices, and B slices. In another embodiment, encoder 402 may encode the value for the flag slice_temporal_mvp_enable_flag when encoder 402 determines that the value should be 1. When encoder 402 determines that the value is 0, then encoder 402 may choose not to encode the value and then decoder 403 infers that the value is 0 by default.

Figure 6:
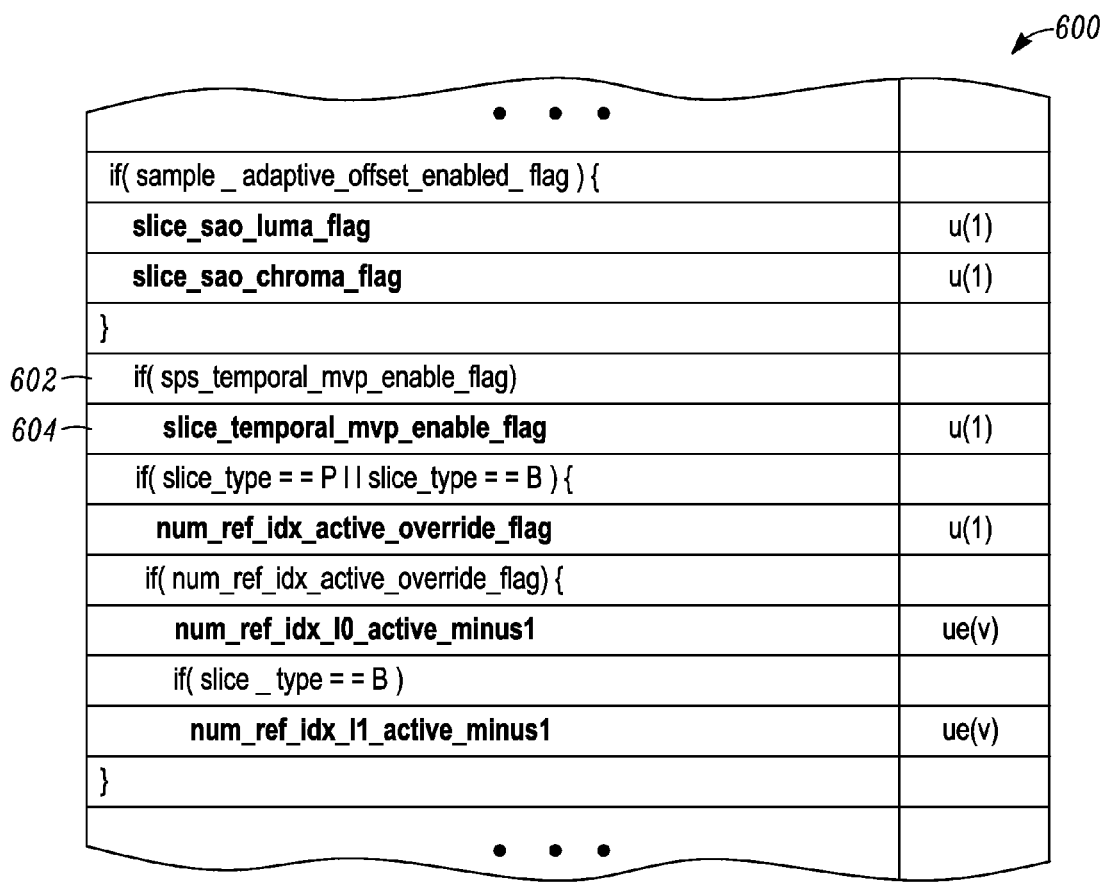
FIG. 6 depicts an example of a syntax according to one embodiment.

A syntax may be used to govern when and where to insert the flag slice_temporal_mvp_enable_flag in the encoded bitstream. FIG. 6 depicts an example of a syntax 600 according to one embodiment. Syntax 600 may be included in a slice header, but the syntax may apply for other headers, such as a sequence parameter set (SPS) header, picture parameter set (PPS) header, or block header. The slice header may be associated with a slice of blocks for a picture. At 602, syntax 600 tests a conditional statement, such as an if statement, for a flag sps_temporal_mvp_enable_flag. The flag sps_temporal_mvp_enable_flag may be a flag that indicates whether temporal motion vector predictors are used for the whole sequence. When temporal MVs are not enabled for a sequence of pictures that includes a current picture (or slice), then the value for the flag slice_temporal_mvp_enable_flag does not need to be included in the encoded bitstream because temporal MVs are not enabled for any pictures for a whole sequence.

If temporal MVs are enabled for the SPS, then syntax 600 may always include a value for the flag slice_temporal_mvp_enable_flag. That is, for I slices, P slices, and B slices, at 604, a value for the flag slice_temporal_mvp_enable_flag is included in the encoded bitstream if the value of the flag sps_temporal_mvp_enable_flag is 1. In other embodiments, when encoder 402 determines that the value is 0, then encoder 402 may choose not to encode the value and then decoder 403 infers that the value is 0 by default.

Figure 7:
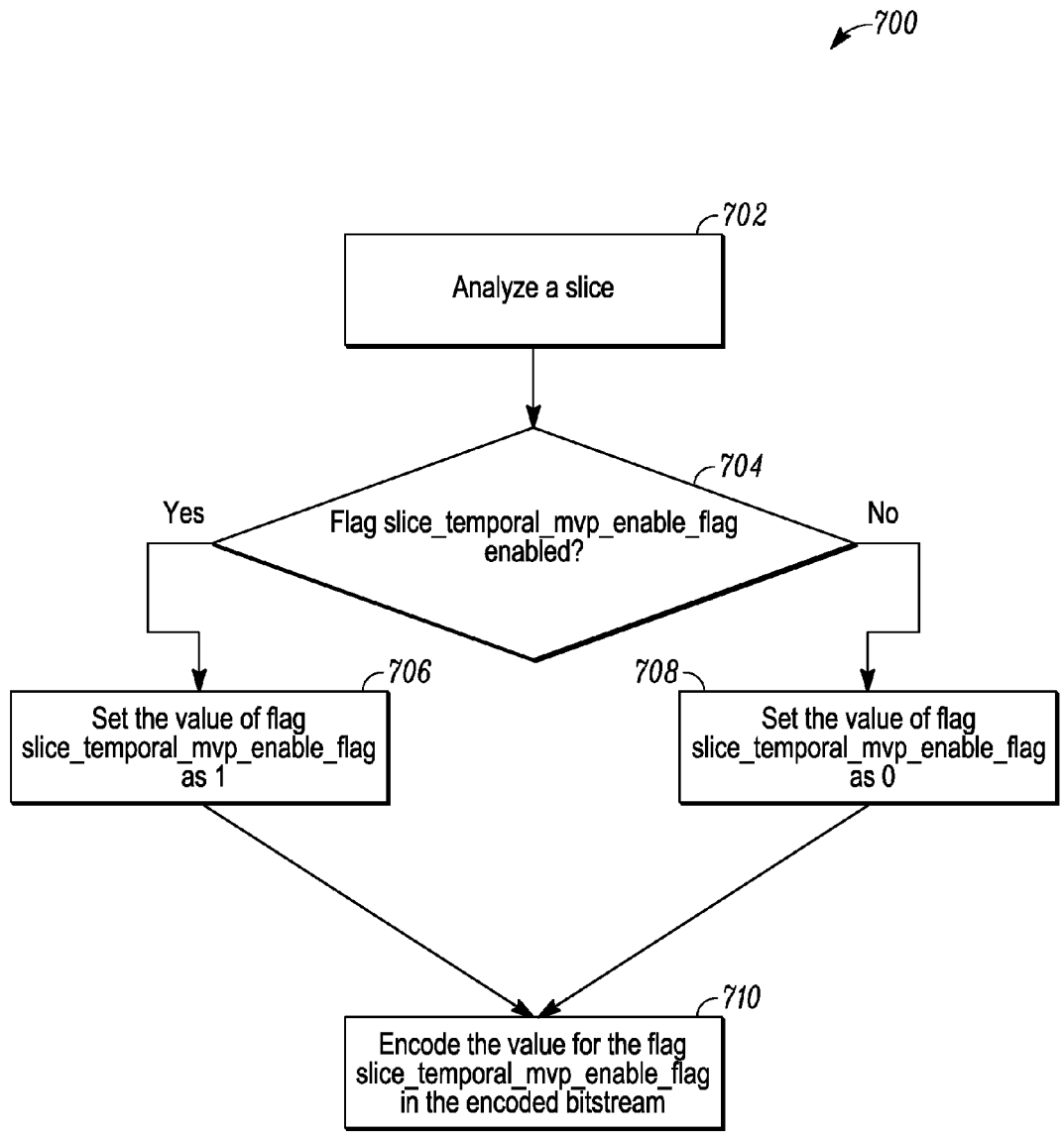
FIG. 7 depicts a simplified flowchart of a method for encoding video according to one embodiment.

FIG. 7 depicts a simplified flowchart 700 of a method for encoding video according to one embodiment. At 702, encoder 402 analyzes a slice, such as an I slice of an I picture. For example, encoder 402 analyzes characteristics of the video to determine, at 704, if the flag slice_temporal_mvp_enable_flag should be enabled for the slice. For example, in some cases, encoder 402 might want to enable the flag slice_temporal_mvp_enable_flag for an I slice even though temporal MVs cannot be used for the I slice. This would allow pictures after the I slice in the decoding order to use temporal MVs from pictures preceding the I slice in the decoding order. In one example, encoder 402 determines that pictures preceding a current picture may better predict pictures occurring after the current picture in the decoding order. Then, encoder 402 enables the flag slice_temporal_mvp_enable_flag.

If the flag slice_temporal_mvp_enable_flag is enabled, at 706, temporal MVP block 404-1 sets the value as 1. At 708, encoder 402 encodes the value for the flag slice_temporal_mvp_enable_flag in the encoded bitstream. For example, encoder 402 encodes the value in a slice header associated with the I slice.

At 708, if the flag slice_temporal_mvp_enable_flag should not be enabled, temporal MVP block 404-1 sets the value as 0. In other embodiments, temporal MVP block 404-1 may not set the value as 0 and the flag slice_temporal_mvp_enable_flag is not included in the encoded bitstream. As discussed above, the decoding process may then infer that this value is 0.

At 710, encoder 402 encodes the value for the flag slice_temporal_mvp_enable_flag in the encoded bitstream. As discussed above, encoder 402 may always include the value for the flag slice_temporal_mvp_enable_flag in the encoded bitstream for all slice types. In other embodiments, encoder 402 may encode the value for the flag slice_temporal_mvp_enable_flag when the value is "1" for all slice types.

Figure 8:
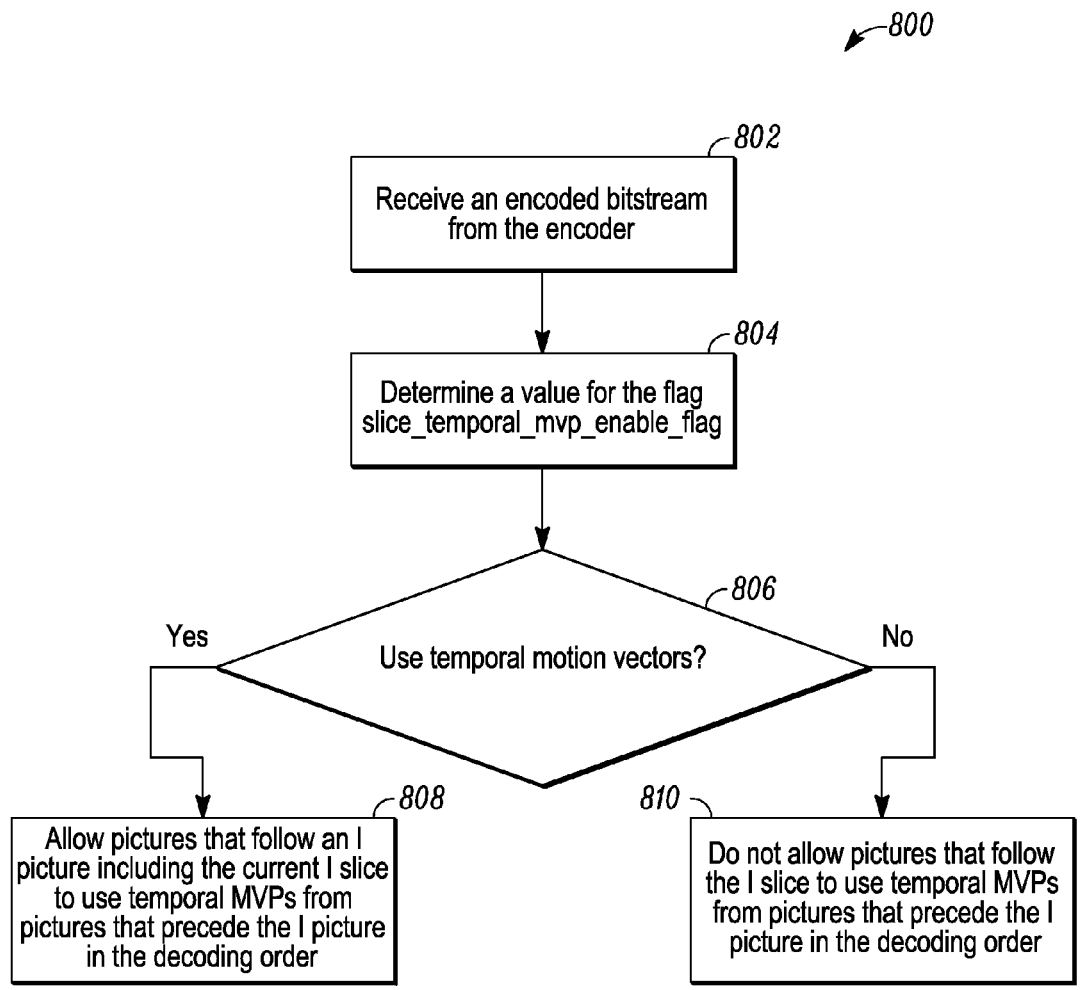
FIG. 8 depicts a simplified flowchart of a method for decoding video according to one embodiment.

FIG. 8 depicts a simplified flowchart 800 of a method for decoding video according to one embodiment. At 802, decoder 403 receives an encoded bitstream from encoder 402. The encoded bitstream includes encoded video along with header information defined by syntax 600 in FIG. 6.

At 804, temporal MVP block 404-2 determines a value for the flag slice_temporal_mvp_enable_flag. For example, a slice header includes an encoded value for the flag slice_temporal_mvp_enable_flag for an I slice currently being decoded.

At 806, decoder 403 determines if pictures following the I slice can use temporal MVs from pictures preceding the I slice in the decoding order. For example, pictures following the I slice can use temporal MVs from pictures before the I slice when the value of the flag slice_temporal_mvp_enable_flag is equal to 1 and the TemporalID is equal to 0. At 808, if the above conditions are true, decoder 403 allows pictures that follow an I picture including the current I slice (but the current I slice does not need to) to use temporal MVs from pictures that precede the I picture in the decoding order. However, if the above conditions are not true (i.e., the value of the flag slice_temporal_mvp_enable_flag is equal to 0 and the TemporalID is equal to 0), at 810, decoder 403 does not allow pictures that follow the I slice to use temporal MVs from pictures that precede the I picture in the decoding order.

Accordingly, particular embodiments may add overhead to the encoded bitstream by having a value for the flag slice_temporal_mvp_enable_flag encoded for I slices (in addition to P slices and B slices). Even though overhead may be added, coding efficiency may be gained by allowing temporal MVs to be used from pictures that precede an I picture.

The flag slice_temporal_mvp_enable_flag is a slice level syntax, and therefore should be used to specify slice-level constraints. If the flag slice_temporal_mvp_enable_flag is set equal to 0 for one slice of a picture and to 1 for another slice of the same picture, decoder 403 will have problems to decide if temporal motion vector predictors shall be used or not for the picture. In one embodiment, the values of flag slice_temporal_mvp_enable_flag for different slices within a same picture should be identical. Furthermore, the flag slice_temporal_mvp_enable_flag will be used to specify whether temporal motion vector predictors shall be used for a current slice, instead of a current picture. The following semantic summarizes the above:

The flag slice_temporal_mvp_enable_flag specifies whether temporal motion vector predictors can be used for inter prediction. If the flag slice_temporal_mvp_enable_flag is equal to 0, the temporal motion vector predictors shall not be used in decoding of the current slice. If the flag slice_temporal_mvp_enable_flag is equal to 1, temporal motion vector predictors may be used in decoding of the current slice. When not present, the value of the flag slice_temporal_mvp_enable_flag shall be inferred to be equal to 0. The flag slice_temporal_mvp_enable_flag should have the same value for all slices within a same picture.

Particular embodiments set the value of slice_temporal_mvp_enable_flag for different slices within a same picture to be identical. The corresponding semantics changes for slice_temporal_mvp_enable_flag are as follows.

The flag slice_temporal_mvp_enable_flag specifies whether temporal motion vector predictors can be used for inter prediction. If the flag slice_temporal_mvp_enable_flag is equal to 0, the temporal motion vector predictors shall not be used in decoding of the current picture. If the flag slice_temporal_mvp_enable_flag is equal to 1, temporal motion vector predictors may be used in decoding of the current picture. When not present, the value of the flag slice_temporal_mvp_enable_flag shall be inferred to be equal to 0. The flag slice_temporal_mvp_enable_flag should have the same value for all slices within a same picture.

In the above semantic, if the value of the flag slice_temporal_mvp_enable_flag is 1, then temporal motion vector predictors may be used in all slices of the picture.

Encoder and Decoder Examples

Figure 9A:
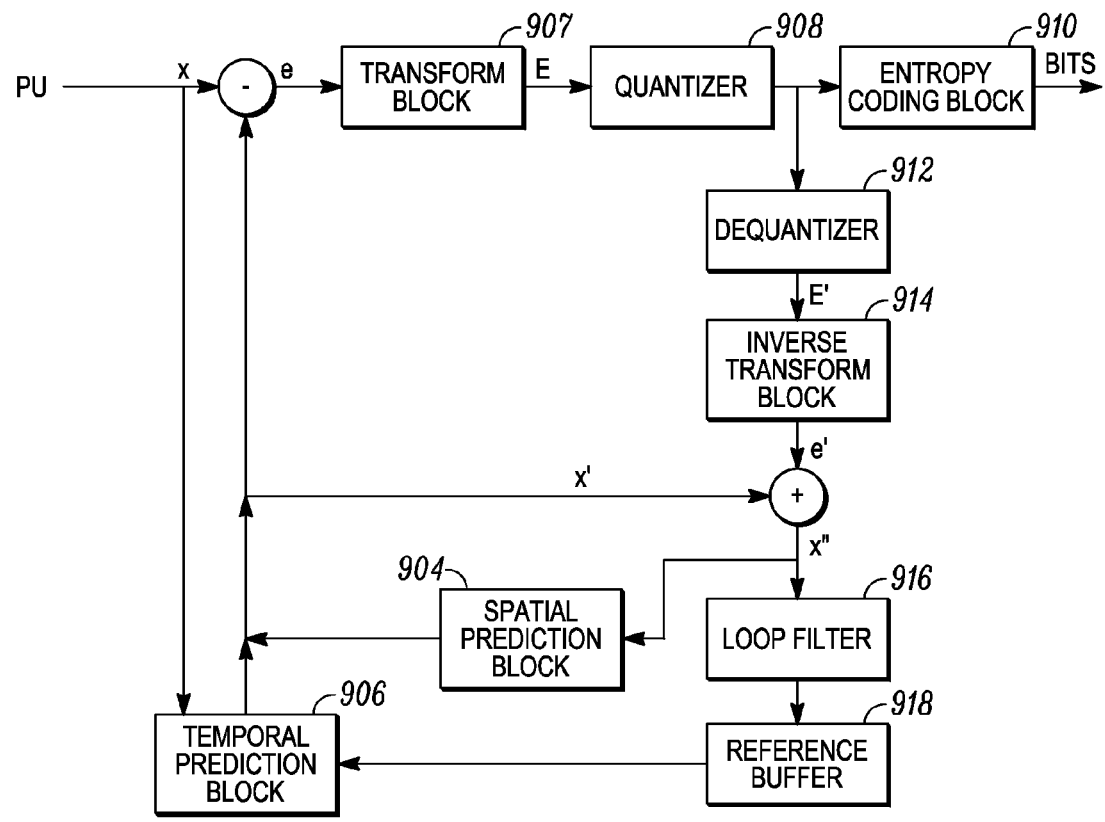
FIG. 9A depicts an example of encoder according to one embodiment.

In various embodiments, encoder 402 described can be incorporated or otherwise associated with a transcoder or an encoding apparatus at a headend and decoder 403 can be incorporated or otherwise associated with a downstream device, such as a mobile device, a set top box or a transcoder. FIG. 9A depicts an example of encoder 402 according to one embodiment. A general operation of encoder 402 will now be described; however, it will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. Spatial prediction relates to intra mode pictures. Intra mode coding can use data from the current input image, without referring to other images, to code an I picture. A spatial prediction block 904 may include different spatial prediction directions per PU, such as horizontal, vertical, 45-degree diagonal, 135-degree diagonal, DC (flat averaging), and planar, or any other direction. The spatial prediction direction for the PU can be coded as a syntax element. In some embodiments, brightness information (Luma) and color information (Chroma) for the PU can be predicted separately. In one embodiment, the number of Luma intra prediction modes for all block sizes is 35. An additional mode can be used for the Chroma intra prediction mode. In some embodiments, the Chroma prediction mode can be called "IntraFromLuma."

Temporal prediction block 906 performs temporal prediction. Inter mode coding can use data from the current input image and one or more reference images to code "P" pictures and/or "B" pictures. In some situations and/or embodiments, inter mode coding can result in higher compression than intra mode coding. In inter mode PUs 204 can be temporally predictive coded, such that each PU 204 of the CU 202 can have one or more motion vectors and one or more associated reference images. Temporal prediction can be performed through a motion estimation operation that searches for a best match prediction for the PU over the associated reference images. The best match prediction can be described by the motion vectors and associated reference images. P pictures use data from the current input image and one or more reference images, and can have up to one motion vector. B pictures may use data from the current input image and one or more reference images, and can have up to two motion vectors. The motion vectors and reference pictures can be coded in the encoded bitstream. In some embodiments, the motion vectors can be syntax elements "MV," and the reference pictures can be syntax elements "refIdx." In some embodiments, inter mode can allow both spatial and temporal predictive coding. The best match prediction is described by the motion vector (MV) and associated reference picture index (refIdx). The motion vector and associated reference picture index are included in the coded bitstream.

Transform block 907 performs a transform operation with the residual PU, e. A set of block transforms of different sizes can be performed on a CU, such that some PUs can be divided into smaller TUs and other PUs can have TUs the same size as the PU. Division of CUs and PUs into TUs 20 can be shown by a quadtree representation. Transform block 907 outputs the residual PU in a transform domain, E.

A quantizer 908 then quantizes the transform coefficients of the residual PU, E. Quantizer 908 converts the transform coefficients into a finite number of possible values. In some embodiments, this is a lossy operation in which data lost by quantization may not be recoverable. After the transform coefficients have been quantized, entropy coding block 910 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 402, a de-quantizer 912 de-quantizes the quantized transform coefficients of the residual PU. De-quantizer 912 then outputs the de-quantized transform coefficients of the residual PU, E'. An inverse transform block 914 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". Particular embodiments may be used in determining the prediction, such as collocated reference picture manager 404 is used in the prediction process to determine the collocated reference picture to use. A loop filter 916 performs de-blocking on the reconstructed PU, x", to reduce blocking artifacts. Additionally, loop filter 916 may perform a sample adaptive offset process after the completion of the de-blocking filter process for the decoded picture, which compensates for a pixel value offset between reconstructed pixels and original pixels. Also, loop filter 916 may perform adaptive loop filtering over the reconstructed PU, which minimizes coding distortion between the input and output pictures. Additionally, if the reconstructed pictures are reference pictures, the reference pictures are stored in a reference buffer 918 for future temporal prediction. Intra mode coded images can be a possible point where decoding can begin without needing additional reconstructed images.

Figure 9B:
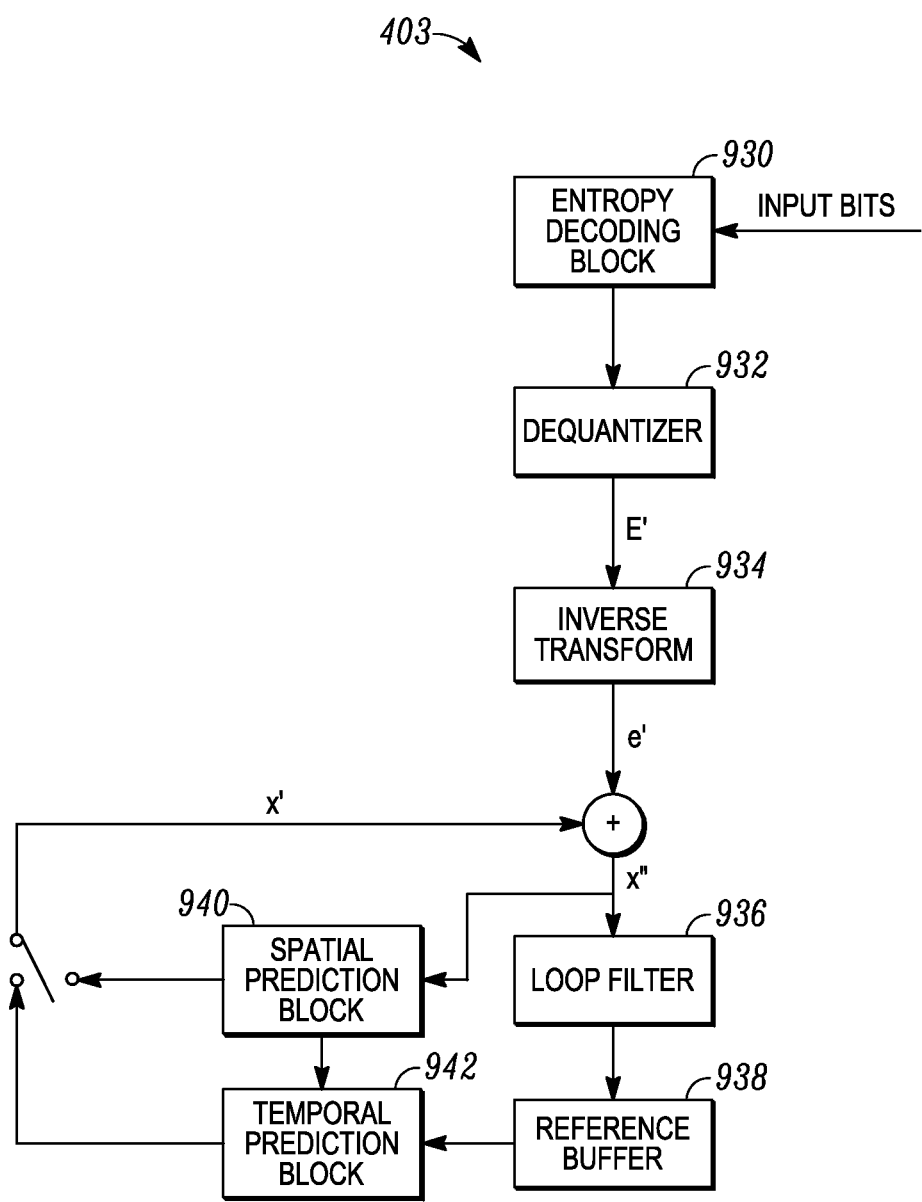
FIG. 9B depicts an example of decoder according to one embodiment.

FIG. 9B depicts an example of decoder 403 according to one embodiment. A general operation of decoder 403 will now be described; however, it will be understood that variations on the decoding process described will be appreciated by a person skilled in the art based on the disclosure and teachings herein. Decoder 403 receives input bits from encoder 402 for encoded video content.

An entropy decoding block 930 performs entropy decoding on the input bitstream to generate quantized transform coefficients of a residual PU. A de-quantizer 932 de-quantizes the quantized transform coefficients of the residual PU. De-quantizer 932 then outputs the de-quantized transform coefficients of the residual PU, E'. An inverse transform block 934 receives the de-quantized transform coefficients, which are then inverse transformed resulting in a reconstructed residual PU, e'.

The reconstructed PU, e', is then added to the corresponding prediction, x', either spatial or temporal, to form the new reconstructed PU, x". A loop filter 936 performs de-blocking on the reconstructed PU, x", to reduce blocking artifacts. Additionally, loop filter 936 may perform a sample adaptive offset process after the completion of the de-blocking filter process for the decoded picture, which compensates for a pixel value offset between reconstructed pixels and original pixels. Also, loop filter 936 may perform adaptive loop filtering over the reconstructed PU, which minimizes coding distortion between the input and output pictures. Additionally, if the reconstructed pictures are reference pictures, the reference pictures are stored in a reference buffer 938 for future temporal prediction.

The prediction PU, x', is obtained through either spatial prediction or temporal prediction. A spatial prediction block 940 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 906 performs temporal prediction through a motion estimation operation. Particular embodiments may be used in determining the prediction, such as collocated reference picture manager 404 is used in the prediction process to determine the collocated reference picture to use. A decoded motion vector is used to determine the prediction PU, x'. Interpolation may be used in the motion estimation operation.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. An apparatus comprising:
    a divider to segment an input video stream into partitions for each of a plurality of partitions of the video stream;
    a channel analyzer coupled to the divider wherein the channel analyzer decomposes the partitions, and
    an encoder coupled to the channel analyzer to encode each decomposed partition into an encoded bitstream to produce a plurality of encoded bitstreams, the channel analyzer including a respective sampler that samples a respective partition by a factor corresponding to a number of channels of the encoder so that a total number of samples in all channels is the same as the number of input samples of the input video stream,
    wherein the encoder utilizes coding information from at least one of the decomposed partitions to be used in encoding the decomposed partitions into the plurality of encoded bitstreams,
    wherein each of the decomposed partitions is the same size.

2. The apparatus according to claim 1 further comprising a reconstruction loop to decode the encoded bitstream and recombine the decoded bitstreams into a reconstructed video stream.

3. The apparatus according to claim 2 further comprising a buffer to store the reconstructed video stream.

4. The apparatus according to claim 1 wherein at least one of the reconstructed video stream and coding information is used as coding information for the encoder.

5. The apparatus according to claim 1 wherein the divider uses at least one of a plurality of feature sets to form the partitions.

6. The apparatus of claim 1 wherein the coding information is at least one of reference picture information and coding information of video stream.

7. The apparatus of claim 6 wherein the reference picture information is determined from reconstructed video stream created from the bitstreams.

8. An apparatus comprising:
- a decoder receiving an encoded bitstream wherein the decoder decodes all or part of the bitstream according to received coding information regarding channels of the encoded bitstream;
- a channel synthesizer coupled to the decoder to synthesize the decoded bitstream into a plurality of partitions of a video stream, the channel synthesizer including a respective up-sampler that upsamples a respective partition by a factor corresponding to a number of channels of the decoder, and
- a combiner coupled to the channel synthesizer to create a reconstructed video stream from all or part of the decoded bitstreams.

9. The apparatus according to claim 8 wherein the coding information includes at least one of the reconstructed video stream and coding information for the reconstructed video stream.

10. The apparatus according to claim 8 further comprising a buffer coupled to the combiner wherein the buffer stores the reconstructed video stream.

11. The apparatus according to claim 10 further comprising a filter coupled between the buffer and decoder to feed back at least a part of the reconstructed video stream to the decoder as coding information.

12. The apparatus according to claim 8 wherein the partitions are determined based on at least one of a plurality of feature sets of an input video stream corresponding to the reconstructed video stream.

13. A method comprising:
- receiving an input video stream;
- partitioning the input video stream into a plurality of partitions;
- decomposing the plurality of partitions including sampling a respective partition by a factor corresponding to a number of channels of an encoder so that a total number of samples in all channels is the same as the number of input samples of the input video stream, and
- encoding the decomposed partitions into an encoded bitstream wherein the encoding uses coding information from channels of the input video stream,
- wherein each of the decomposed partitions is the same size.

14. The method of claim 13 wherein the encoding further includes receiving a reconstructed video stream derived from the encoded bitstreams as an input used to encode the partitions into the bitstream.

15. The method of claim 13 further comprising buffering a reconstructed video stream reconstructed from the encoded bitstreams to be used as coding information for other channels of the input video stream.

16. The method of claim 13 wherein the coding information is at least one of reference picture information and coding information of video stream.

17. A method comprising:
- receiving at least one encoded bitstream;
- decoding all or part of the received bitstream wherein the decoding uses coding information from channels of an input video stream;
- synthesizing the decoded bitstream into a plurality of partitions of the input video stream, including upsampling a respective partition by a factor corresponding to a number of channels of a decoder for the decoding, and
- combining one or more of the partitions into a reconstructed video stream.

18. The method according to claim 17 wherein the coding information is at least one of reference picture information and coding information of the input video stream.

19. The method according to claim 17 further comprising using the reconstructed video stream as input for decoding the bitstreams.

20. The method according to claim 19 further comprising synthesizing the reconstructed video stream for decoding the bitstream.

* * * * *